(12) United States Patent
Kamalasadan et al.

(10) Patent No.: US 9,843,189 B2
(45) Date of Patent: Dec. 12, 2017

(54) GRID TIED SYSTEM CONTROLLER INCLUDING LOGIC COUPLED TO A PHOTOVOLTAIC STATION AND AN ENERGY STORAGE SYSTEM

(71) Applicants: Sukumar Kamalasadan, Concord, NC (US); Sherif Abdelmageed Abdelrazek, Charlotte, NC (US); Johan H. R. Enslin, Huntersville, NC (US); Daniel Blair Sowder, Bainbridge Island, WA (US)

(72) Inventors: Sukumar Kamalasadan, Concord, NC (US); Sherif Abdelmageed Abdelrazek, Charlotte, NC (US); Johan H. R. Enslin, Huntersville, NC (US); Daniel Blair Sowder, Bainbridge Island, WA (US)

(73) Assignees: The University of North Carolina at Charlotte, Charlotte, NC (US); Duke Energy Corporation, Charlotte, NC (US)

( * ) Notice: Subject to any disclaimer, the term of this patent is extended or adjusted under 35 U.S.C. 154(b) by 121 days.

(21) Appl. No.: 14/714,933

(22) Filed: May 18, 2015

(65) Prior Publication Data

US 2015/0333523 A1  Nov. 19, 2015

Related U.S. Application Data (60) Provisional application No. 62/000,049, filed on May 19, 2014.

(51) Int. Cl.
*H02J 3/32* (2006.01)
*H02J 3/38* (2006.01)
(Continued)

(52) U.S. Cl.
CPC ............. *H02J 3/32* (2013.01); *H02J 3/383* (2013.01); *H02J 7/0057* (2013.01);
(Continued)

(58) Field of Classification Search
CPC .. H02J 3/32; H02J 3/383; H02J 7/0073; H02J 7/0057; H02J 2003/007; Y02E 10/563;
(Continued)

(56) References Cited

U.S. PATENT DOCUMENTS 7,071,579 B2 * 7/2006 Erdman ................ F03D 7/0284
290/44
7,945,524 B2 * 5/2011 Anderson ............ G06N 99/005
706/12

(Continued)

*Primary Examiner* — Naum B Levin
(74) *Attorney, Agent, or Firm* — Clements Bernard Walker PLLC; Christopher L. Bernard (57) ABSTRACT

A battery energy storage system control system, including: logic coupled to a photovoltaic station and an energy storage system and executing a photovoltaic station capacity firming algorithm operable for making a combined output of the photovoltaic station and the energy storage system substantially constant such that power swings on an associated feeder system are avoided; logic coupled to the photovoltaic station and the energy storage system and executing a voltage support algorithm operable for holding point of common coupling voltage and phase values substantially equal to substation voltage and phase values via power injection or removal; and logic coupled to the photovoltaic station and the energy storage system and executing an energy time shift algorithm operable for storing energy during periods of relatively low demand and providing energy during periods of relatively high demand.

15 Claims, 12 Drawing Sheets

(51) Int. Cl.
*H02J 7/00* (2006.01)
*H02J 3/00* (2006.01)

(52) U.S. Cl.
CPC ....... H02J 7/0073 (2013.01); *H02J 2003/007* (2013.01); *Y02E 10/563* (2013.01); *Y02E 10/566* (2013.01); *Y02E 40/10* (2013.01); *Y02E 60/76* (2013.01); *Y02E 70/30* (2013.01); *Y04S 40/22* (2013.01)

(58) Field of Classification Search
CPC ....... Y02E 10/566; Y02E 60/76; Y02E 70/30; Y04S 40/22
See application file for complete search history.

(56) References Cited

U.S. PATENT DOCUMENTS

| | | | | |
|---|---|---|---|---|
| 8,159,178 B2* | 4/2012 | Serban | ................ | G05F 1/67 320/101 |
| 8,466,581 B2* | 6/2013 | Kuran | ................ | H02J 3/38 307/69 |
| 8,577,510 B2* | 11/2013 | Powell | ................ | G01D 4/002 290/44 |
| 8,693,228 B2* | 4/2014 | Matan | ................ | H02J 3/18 323/207 |
| 9,136,732 B2* | 9/2015 | Wolter | ................ | H02J 7/35 |
| 9,306,396 B2* | 4/2016 | Prosser | ................ | H02J 4/00 |
| 9,325,173 B2* | 4/2016 | Varma | ................ | H02J 3/01 |
| 9,331,487 B2* | 5/2016 | Yuan | ................ | H02J 3/382 |
| 9,368,968 B2* | 6/2016 | Schrock | ................ | H02J 3/28 |
| 9,406,094 B2* | 8/2016 | Kearns | ................ | H02J 3/00 |
| 2003/0047209 A1* | 3/2003 | Yanai | ................ | H02J 3/32 136/244 |
| 2010/0286840 A1* | 11/2010 | Powell | ................ | G01D 4/002 700/295 |
| 2011/0043160 A1* | 2/2011 | Serban | ................ | G05F 1/67 320/101 |
| 2012/0205981 A1* | 8/2012 | Varma | ................ | H02J 3/01 307/64 |
| 2013/0190939 A1* | 7/2013 | Lenox | ................ | H02J 3/32 700/291 |
| 2014/0039710 A1* | 2/2014 | Carter | ................ | G06Q 10/06 700/291 |
| 2014/0052305 A1* | 2/2014 | Kearns | ................ | H02J 3/00 700/295 |
| 2014/0172183 A1* | 6/2014 | Beeman | ................ | H02J 3/32 700/291 |
| 2015/0155712 A1* | 6/2015 | Mondal | ................ | H02J 3/1857 307/23 |
| 2015/0155715 A1* | 6/2015 | Kobayashi | ................ | H02J 3/32 307/24 |
| 2015/0188482 A1* | 7/2015 | Berkowitz | ................ | H02J 3/383 320/101 |
| 2015/0295581 A1* | 10/2015 | Shi | ................ | H02J 3/40 700/287 |

* cited by examiner

| | | | | | | | |
|---|---|---|---|---|---|---|---|
| Feeder Regulators Operation (No ESS) | 0.974 | 1.003 | 0.988 | 1.01 | 2 | 7 | 8 |
| ESS Compensation | 0.978 | 1 | 0.986 | 1.0051 | 0 | 1 | 3 |

GRID TIED SYSTEM CONTROLLER INCLUDING LOGIC COUPLED TO A PHOTOVOLTAIC STATION AND AN ENERGY STORAGE SYSTEM

CROSS-REFERENCE TO RELATED APPLICATION

The present patent application/patent claims the benefit of priority of U.S. Provisional Patent Application No. 62/000,049, filed on May 19, 2014, and entitled "GRID TIED BATTERY ENERGY STORAGE SYSTEM CONTROLLER," the contents of which are incorporated in full by reference herein.

FIELD OF THE DISCLOSURE

The present disclosure relates generally to the energy storage field. More specifically, the present disclosure relates to grid tied battery energy storage system (BESS) controller systems and methods.

BACKGROUND OF THE DISCLOSURE

In general, there is great interest in developing and implementing improved BESS controllers that are capable of directing the inverters of energy storage systems (ESSs) to dispatch active and reactive power in a manner that benefits a distribution system and a utility. This involves three important functions: 1) photovoltaic (PV) station capacity firming, 2) voltage support, and 3) energy time shift. PV station capacity firming involves suppressing large power swings that could potentially harm utility generation units. Voltage support involves providing a tighter voltage band across a feeder on which an ESS is installed. Voltage support also aims to reduce feeder voltage regulator tap changes, leading to an increase in regulator life. Finally, energy time shift involves performing peak load shaving by storing energy at times when cost is low and discharging energy at feeder peak load times. Thus, what is still needed in the art is a new way in which a grid tied BESS can be controlled and used.

BRIEF SUMMARY OF THE DISCLOSURE

In various exemplary embodiments, the present disclosure provides such improved BESS controllers that are capable of directing the inverters of ESSs to dispatch active and reactive power in a manner that benefits the distribution system and the utility. This involves three important functions: 1) PV station capacity firming, 2) voltage support, and 3) energy time shift. PV station capacity firming accordingly involves suppressing large power swings that could potentially harm utility generation units. Voltage support accordingly involves providing a tighter voltage band across a feeder on which an ESS is installed. Voltage support also accordingly aims to reduce feeder voltage regulator tap changes, leading to an increase in regulator life. Finally, energy time shift accordingly involves performing peak load shaving by storing energy at times when cost is low and discharging energy at feeder peak load times. Thus, the present disclosure provides a new way in which a grid tied BESS can be controlled and used.

In one exemplary embodiment, the present disclosure provides a battery energy storage system control system, including: logic coupled to a photovoltaic station and an energy storage system and executing a photovoltaic station capacity firming algorithm operable for making a combined output of the photovoltaic station and the energy storage system substantially constant such that power swings on an associated feeder system are avoided; logic coupled to the photovoltaic station and the energy storage system and executing a voltage support algorithm operable for holding point of common coupling voltage and phase values substantially equal to substation voltage and phase values via power injection or removal; and logic coupled to the photovoltaic station and the energy storage system and executing an energy time shift algorithm operable for storing energy during periods of relatively low demand and providing energy during periods of relatively high demand. The photovoltaic station capacity firming algorithm derives an optimal reference power output curve from historical data. The energy storage system supplements power output of the photovoltaic station to substantially match the optimal reference power output curve. The photovoltaic station capacity firming algorithm includes intermittency detection logic that idles the energy storage system when a power output of the photovoltaic station is sufficiently constant. The voltage support algorithm monitors the point of common coupling voltage and phase values and the substation voltage and phase values in real time. The energy time shift algorithm calculates a probable time of peak load on a given feeder based on historical data and begins energy storage system discharge at a corresponding predetermined time to ensure peak load shaving.

In another exemplary embodiment, the present disclosure provides a battery energy storage system control method, including: making a combined output of the photovoltaic station and the energy storage system substantially constant such that power swings on an associated feeder system are avoided via logic coupled to a photovoltaic station and an energy storage system using a photovoltaic station capacity firming algorithm; holding point of common coupling voltage and phase values substantially equal to substation voltage and phase values via power injection or removal via logic coupled to the photovoltaic station and the energy storage system using a voltage support algorithm; and storing energy during periods of relatively low demand and providing energy during periods of relatively high demand via logic coupled to the photovoltaic station and the energy storage system using an energy time shift algorithm. The photovoltaic station capacity firming algorithm derives an optimal reference power output curve from historical data. The energy storage system supplements power output of the photovoltaic station to substantially match the optimal reference power output curve. The photovoltaic station capacity firming algorithm includes intermittency detection logic that idles the energy storage system when a power output of the photovoltaic station is sufficiently constant. The voltage support algorithm monitors the point of common coupling voltage and phase values and the substation voltage and phase values in real time. The energy time shift algorithm calculates a probable time of peak load on a given feeder based on historical data and begins energy storage system discharge at a corresponding predetermined time to ensure peak load shaving.

In a still further exemplary embodiment, the present disclosure provides an energy delivery system, including: a photovoltaic station; an energy storage system; logic coupled to the photovoltaic station and the energy storage system and executing a photovoltaic station capacity firming algorithm operable for making a combined output of the photovoltaic station and the energy storage system substantially constant such that power swings on an associated feeder system are avoided; logic coupled to the photovoltaic station and the energy storage system and executing a voltage support algorithm operable for holding point of common coupling voltage and phase values substantially equal to substation voltage and phase values via power injection or removal; and logic coupled to the photovoltaic station and the energy storage system and executing an energy time shift algorithm operable for storing energy during periods of relatively low demand and providing energy during periods of relatively high demand. The photovoltaic station capacity firming algorithm derives an optimal reference power output curve from historical data. The energy storage system supplements power output of the photovoltaic station to substantially match the optimal reference power output curve. The photovoltaic station capacity firming algorithm includes intermittency detection logic that idles the energy storage system when a power output of the photovoltaic station is sufficiently constant. The voltage support algorithm monitors the point of common coupling voltage and phase values and the substation voltage and phase values in real time. The energy time shift algorithm calculates a probable time of peak load on a given feeder based on historical data and begins energy storage system discharge at a corresponding predetermined time to ensure peak load shaving.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure provides a complete battery energy storage management scheme that maximizes the potential value that can be brought to medium voltage feeders and the like. The potential performance benefits include improved system reliability, improved dynamic stability, enhanced power quality, transmission capacity enhancement, and improved area protection. The coordination of ancillary service applications, mainly voltage support, along with other applications like PV capacity firming and ETS, represents significant innovation, as the choice of applications acting at a given instance is dictated by grid need. This maximizes the value of the ESS to the feeder.

The PV station capacity firming algorithm involves supplying (i.e. discharging) and consuming (i.e. charging) power in a manner that makes the combined output of the PV station and the ESS constant to some extent. This serves to reduce large power swings on the feeder, which could cause generation units to destabilize if proper control action is not taken. The algorithm relies on recording several days of PV output data and analyzing it to obtain an optimal reference power output curve to which the ESS aims to modify the PV output. The resulting firmed capacity offsets the need to purchase or 'rent' additional dispatchable electric supply resources (i.e. capacity). Depending on location, firmed renewable energy output may also offset the need for transmission and/or distribution equipment. Renewables capacity firming is especially valuable when peak demand occurs.

The BESS control algorithm for PVCF aims to minimize PV station power swings. The PVCF algorithm focuses on large power swings occurring at noon, for example, when PV output is at its peak. These swings are the most crucial to minimize transients at substation generation units.

The PVCF algorithm develops the characteristic maximum PV curve for the PV station location at that time of year. For a daily output power of PV station $P_k(t)$, where k signifies the day; k=1, 2, 3, 4, . . . n; the characteristic maximum PV curve is given by:

$$P_m(t) = \max(P_1(t), P_2(t), P_3(t) \ldots P_n(t)) \quad (1)$$

Further, the smoothed characteristic maximum power curve (SCMPC) is defined as:

$$P_{SCMP}(t) = \begin{cases} P_m(t) & \text{for } L_l < \frac{\Delta P_m(t)}{\Delta t} < U_l \\ U_l \Delta t + P_m(t - \Delta t) & \text{for } \frac{\Delta P_m(t)}{\Delta t} > U_l \\ L_l \Delta t + P_m(t - \Delta t) & \text{for } \frac{\Delta P_m(t)}{\Delta t} < L_l \end{cases} \quad (2)$$

$$P_{OPR}(t) = m \times P_{SCMP}(t) \quad (3)$$

where $\Delta t$ is the sampling time of the PV power output measurement—in our case it is 30 sec, for example. $U_l$ and $L_l$ are the maximum allowed rate of increase and decrease of the SCMPC, respectively. The PV optimum power reference curve (OPR) is a fraction of the SCMP curve. The multiplication factor m is chosen such that maximum firming is attained for the described PV station from the used ESS. The multiplication factor m is also varied to optimize the ESS state of charge at the end of the daytime to allow sufficient charge for other battery functions.

Intermittency detection allows one to idle the battery during times when PV output power is smooth and does not require any conditioning. The intermittency detection algorithm relies on constantly tracking the rate of change of the difference $P_c$ between the output PV power and the OPF curve. The real time measured values of $P_c$ are passed through a low pass filter, which rejects sudden power fluctuations to obtain $P_{cf}$. $P_{cf}$ is then subtracted from $P_c$ to obtain D. If the value of D violates an upper or lower limit, intermittency is then assumed to be present and firming is commenced. Smoothing continues till value of D is maintained within limits for a period $T_d$.

$$P_c(t) = P_{pv}(t) - P_{OPR}(t) \qquad (4)$$

$$P_{cf}(t) = \begin{cases} P_c(t) & \text{for } L_{l2} < \frac{\Delta P_c(t)}{\Delta t} < U_{l2} \\ U_l \Delta t + P_c(t - \Delta t) & \text{for } \frac{\Delta P_c(t)}{\Delta t} > U_{l2} \\ L_l \Delta t + P_c(t - \Delta t) & \text{for } \frac{\Delta P_c(t)}{\Delta t} < L_{l2} \end{cases} \qquad (5)$$

$$D(t) = P_c(t) - P_{cf}(t) \qquad (6)$$

Figure 4:
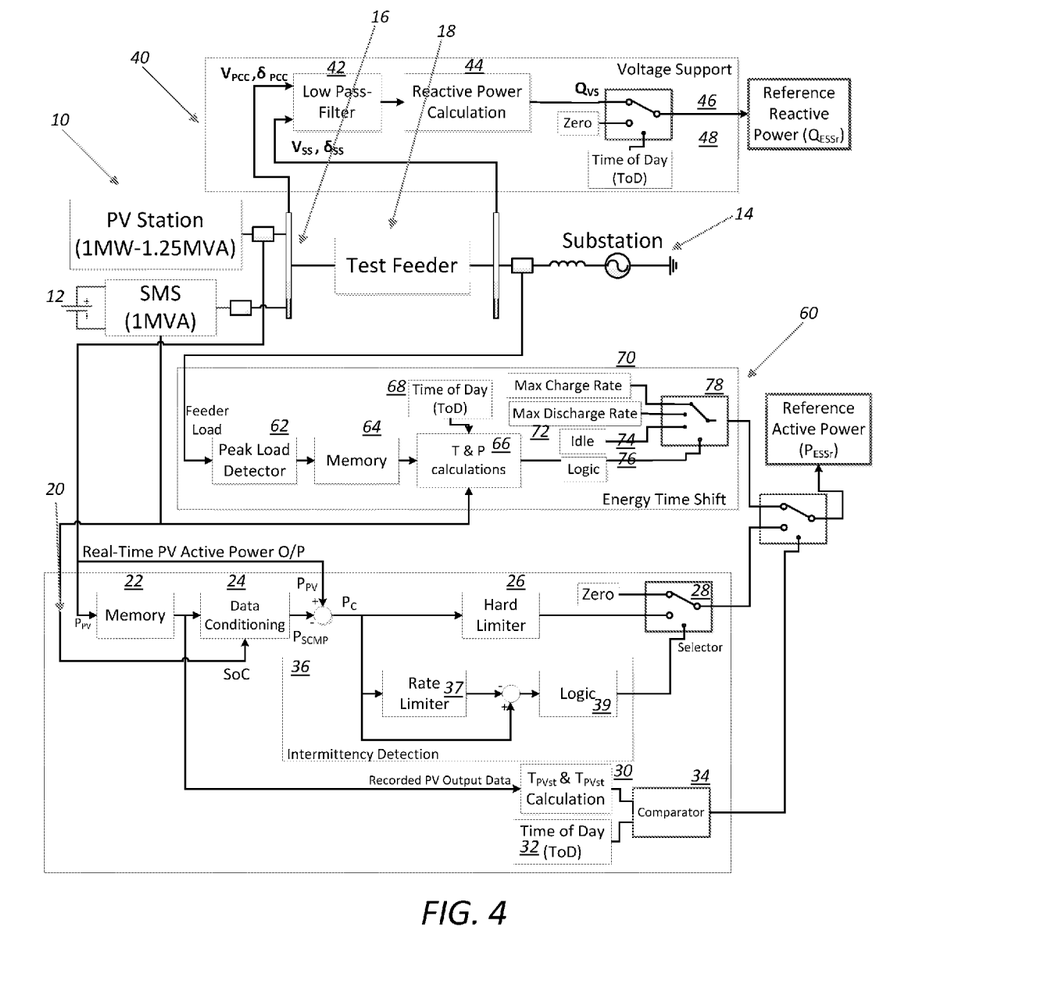
FIG. 4 is a schematic diagram illustrating the PV station capacity firming, voltage support, and energy time shift (ETS) functionalities of the present disclosure.
Figure 5:
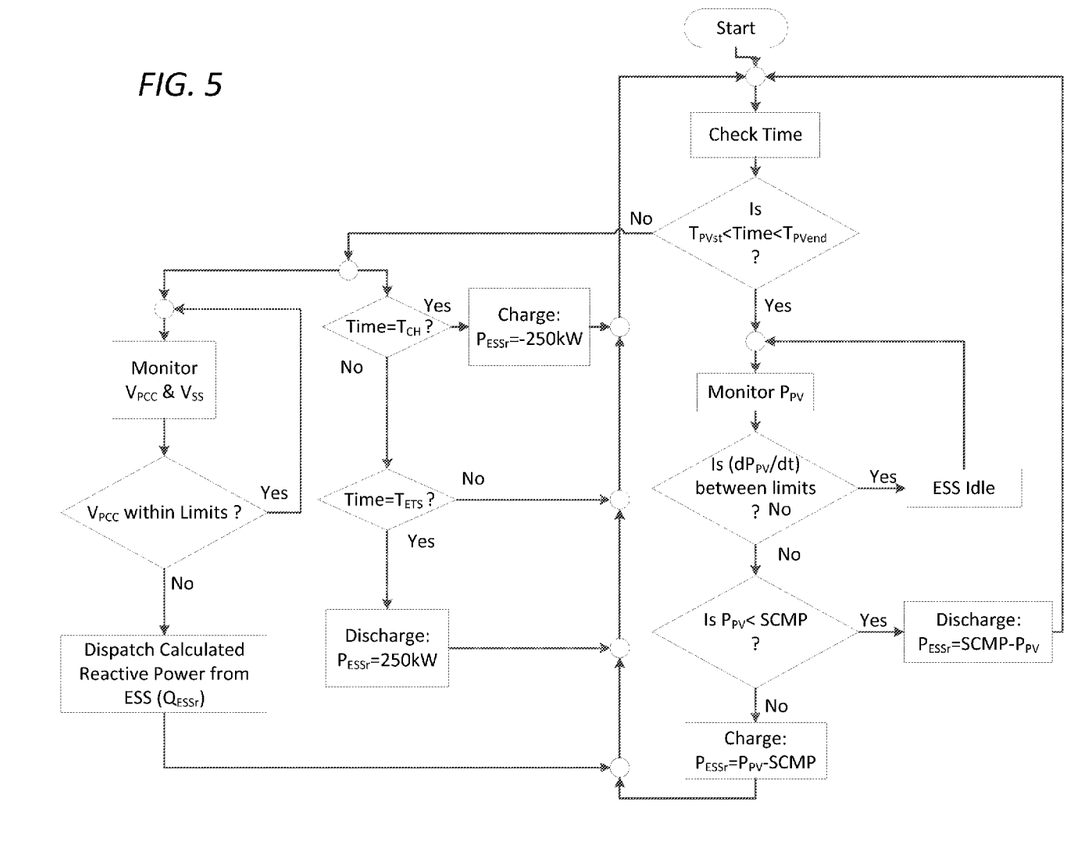
FIG. 5 is a flowchart illustrating BESS control for the PV station capacity firming, voltage support, and ETS functionalities of the present disclosure.

FIGS. 4 and 5 graphically represent this PVCF mechanism and algorithm, respectively. Referring specifically to FIG. 4, the PV station capacity firming control block 20 is coupled to the PV station 10 and the ESS 12, as well as the substation 14 through a point of common coupling (PCC) 16 and a test feeder 18. The PVCF block 20 includes a memory 22, a data conditioning block 24, a hard limiter 26, a selection block 28, a calculation block 30, a timing block 32, a comparator 34, and an intermittency detection block 36, which includes a rate limiter 37 and appropriate logic 39.

Voltage support represents one of the main and most important applications benefiting utilities and grid operators. Maintaining the voltage within permissible levels is of utmost importance to utilities. Radial networks exhibit voltage depression as the distance from the substation increases. Utilities invest considerable amounts of money on capacitor banks and static VAR compensators to keep voltage levels steady within the permissible band. These devices generate reactive power to counter reactive power sinks represented in feeder lines and poor power factor loads connected to the grid, like fans, air conditioning systems, washers, and dryers, for example. Utilities also invest in numerous voltage regulators (VRs) and load tap changers (LTCs) per feeder. These devices vary the number of turns connected to their primary or secondary windings in order either to buck or boost the voltage, depending on the need. Unfortunately, each tap change for such devices decreases their remaining life, which forces utilities to invest in new VRs and LTCs after a shorter period of time. Since VRs and LTCs operate relatively slower than VAR compensators, the disclosed ESS controller voltage support function can compensate for reactive power leading to voltage band tightening, which, in turn, leads to a decreased total number of regulator operations and tap changes.

The voltage support algorithm relies on comparing the PCC voltage and phase values to the substation voltage and phase values. The required reactive power to be injected or drained to hold the voltage at the same value of that of the substation is calculated and set as a reference value $Q_{essr}$ for the BESS.

Figure 1:
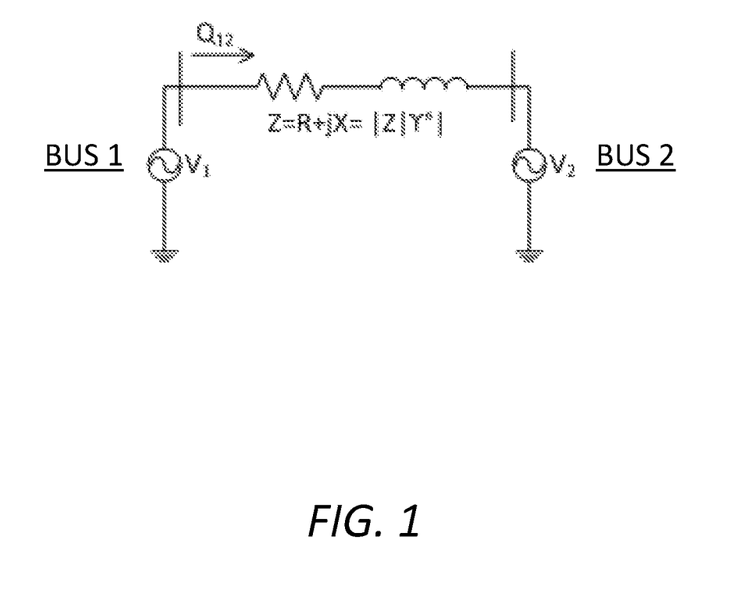
FIG. 1 is a schematic diagram illustrating a two bus system and depicting reactive power transmission.

The reactive power $Q_{12}$ transmitted in a two bus system from bus 1 to bus 2, shown in FIG. 1, is given by:

$$Q_{12} = \frac{|V_1|^2}{|Z|}\sin Y - \frac{|V_1||V_2|}{|Z|}\sin(Y + \delta_1 - \delta_2) \qquad (7)$$

where $\delta_1$ and $\delta_2$ are the respective voltage angles at buses 1 and 2. Feeder resistance is relatively small as compared to inductance, so the feeder lines are assumed to be fully reactive, i.e. (R=0, Z=jX). Equation 7 becomes:

$$Q_{12} = \frac{|V_1|^2}{X} - \frac{|V_1||V_2|}{X}\cos(\delta_1 - \delta_2) \qquad (8)$$

Figure 2:
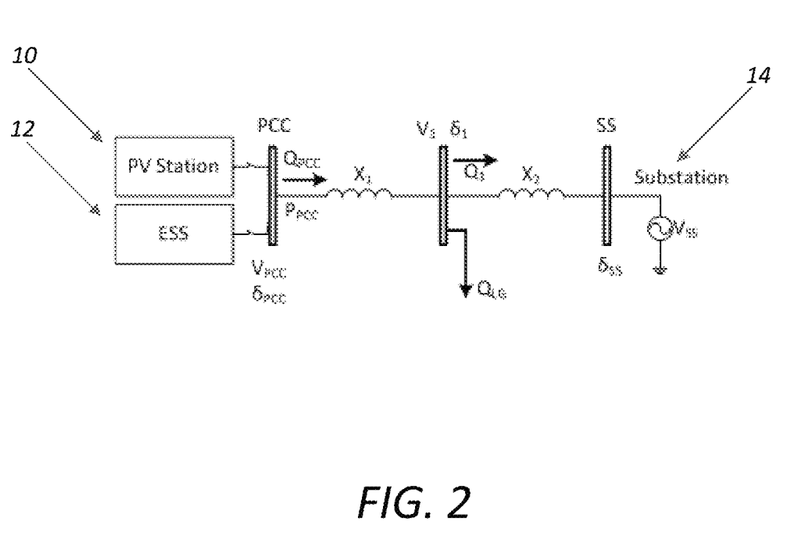
FIG. 2 is a schematic diagram illustrating an aggregated model of a medium voltage feeder.

Applying Equation 8 to the system in FIG. 2, one gets:

$$Q_1 = \frac{|V_1|^2}{X_2} - \frac{|V_1||V_{ss}|}{X_2}\cos(\delta_1 - \delta_{ss}) + \qquad (9)$$
$$\frac{|V_1|^2}{X_1} - \frac{|V_1||V_{PCC}|}{X_1}\cos(\delta_1 - \delta_{PCC}) + Q_{LG} = 0$$

$$Q_{PCC} = \frac{|V_{PPC}|^2}{X_1} - \frac{|V_{PPC}||V_1|}{X_1}\cos(\delta_{PPC} - \delta_1) \qquad (10)$$

From Equations 9 and 10, one gets:

$$Q_{PCC} = \frac{|V_{PPC}|^2}{X_1} - \frac{|V_1||V_{ss}|}{X_2}\cos(\delta_1 - \delta_{ss}) + \frac{|V_1|^2}{X_2} + \frac{|V_1|^2}{X_1} + Q_{LG} \qquad (11)$$

The goal is to calculate the reactive power to be injected at the PCC to attain a voltage equal to the voltage at the substation. So, we equate $V_{PCC}$ to $V_{SS}$ in Equation 11. Under this condition, we assume the voltage at bus 1 to be 1 pu. The active power injected at PCC is zero, since active power supplied by the ESS is zero during voltage support. Equation 12 represents the approximate reactive power amount to be injected at the PCC to attain a voltage equal to that at the substation:

$$Q_{PCC} = \frac{|V_{SS}|^2}{X_1} - \frac{|V_{ss}|}{X_2}\cos(\delta_{PCC} - \delta_{ss}) + \frac{1}{X_1} + \frac{1}{X_2} + Q_{LG} \qquad (12)$$

Voltage at the substation and the PCC is constantly monitored. $Q_{PCC}$ is calculated during operation and given to the ESS as a reference to support the voltage at the PCC. The reactance and reactive power $Q_{LG}$ at the bus 1 term in Equation 12 is considered as a constant in real time and is tuned till optimum reactive power support is attained.

FIGS. 4 and 5 graphically represent this voltage support mechanism and algorithm, respectively. Referring specifically to FIG. 4, the voltage support control block 40 is coupled to the PV station 10 and the ESS 12, as well as the substation 14 through a point of common coupling (PCC) 16 and a test feeder 18. The voltage support block 40 includes a low-pass filter (LPF) 42, a reactive power calculator 44, a selection block 46, and a timing block 48.

The energy time shift application aims to provide an innovative way for utilities to store energy at time when it is least needed, i.e. cheap, and provide it in times when it is most needed by consumers, i.e. expensive. The algorithm calculates the most probable time of peak load on a certain feeder and begins battery discharge at a suitable time to ensure peak load shaving. This leads to several advantages, such as offsetting the need to buy new generation units and decreasing the cost of power generation.

Figure 3:
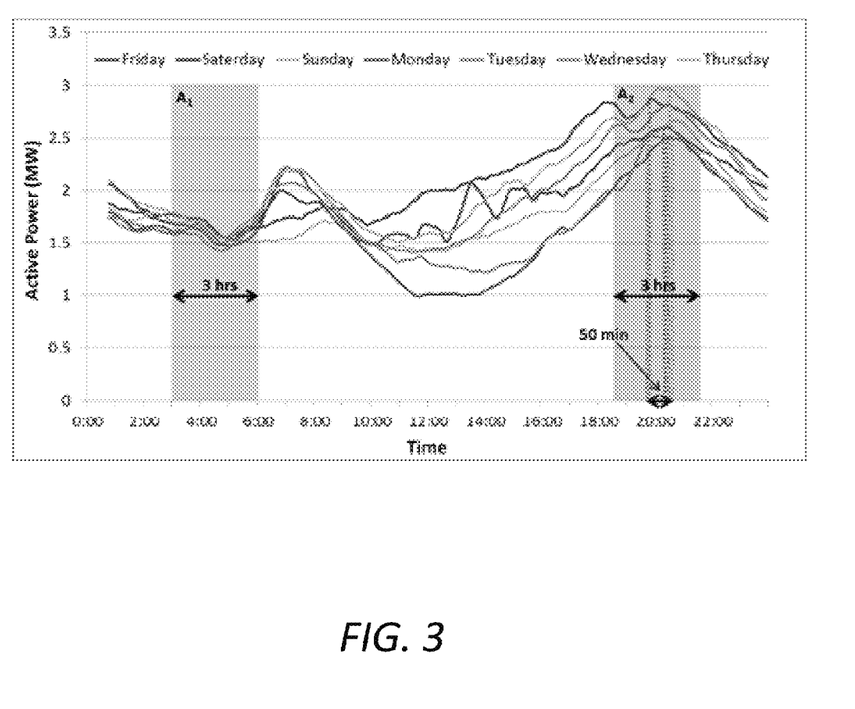
FIG. 3 is a plot illustrating the load curves of a practical feeder in a residential area for the week of Sep. 21, 2012, by way of example.

Studying the load curves of a practical feeder over one week's interval, for example, it was found that the time difference between load peak maximums of two consecutive days was less than 40 minutes, whereas the maximum difference throughout the week was found to be 50 minutes, as shown in FIG. 3.

Relying on this realization, the ETS application was designed such that the discharge period of the ESS is determined by the load curve maximum of the previous day. The algorithm checks the battery state of charge SoC and calculates the time of day to commence battery discharge, such that the load curve maximum of the previous day lies in the middle of the discharge time interval:

$$T_{Dstart} = T_{Lpeak} - \frac{(SoC) \times E_{Cap}}{2 \times P_D} \qquad (13)$$

Assuming the battery is fully charged and will perform ETS at 250 kW, for example, the total time of discharge is 3 hours. This covers the load curve peak time difference between the two consecutive days. Also, since load curves of most days show minimal load at 4:30 am, the ETS algorithm is set to start charging the battery at 3 am to avoid the local maximum that occurs at 7:00 am.

FIGS. 4 and 5 graphically represent this ETS mechanism and algorithm, respectively. Referring specifically to FIG. 4, the ETS control block 60 is coupled to the PV station 10 and the ESS 12, as well as the substation 14 through a point of common coupling (PCC) 16 and a test feeder 18. The ETS block 60 includes a peak load detector block 62, a memory block 64, a calculation block 66, a timing block 68, a maximum charge rate block 70, a maximum discharge rate block 72, an idle block 74, appropriate logic 76, and a selector block 78.

Figure 6:
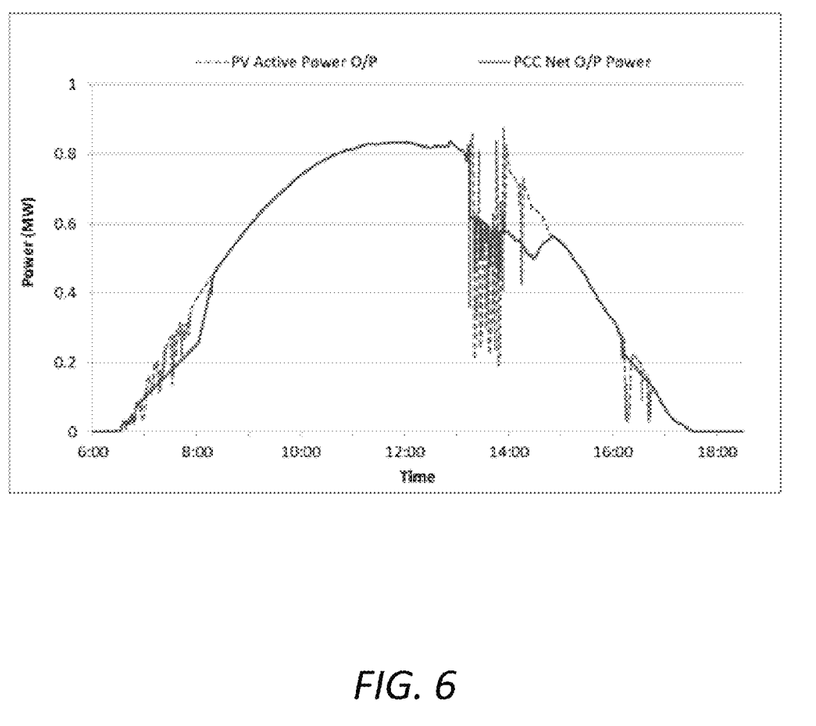
FIG. 6 is a plot illustrating PV station capacity firming simulation results for PCC active power output after PV station capacity firming as compared to PV power output with no ESS intervention.
Figure 7:
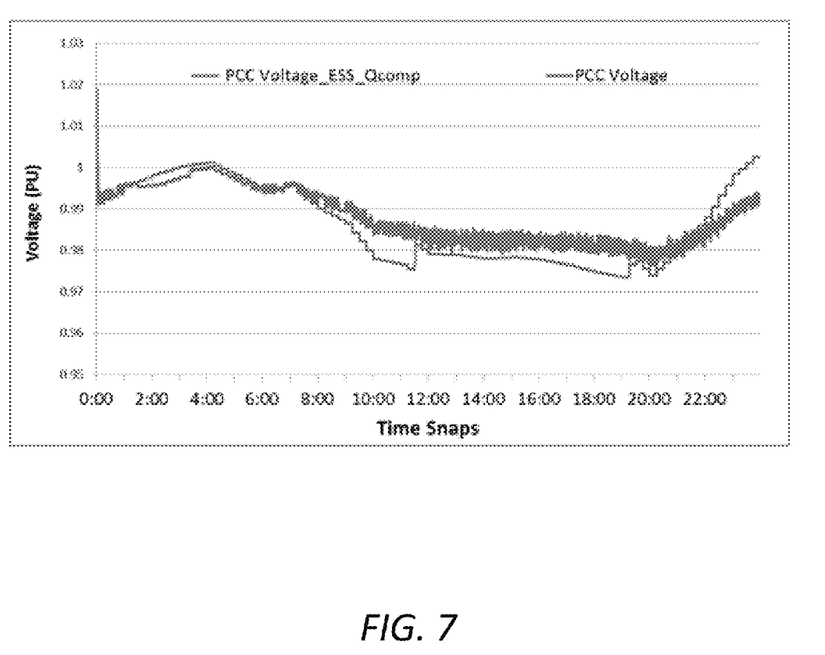
FIG. 7 is a plot illustrating voltage profile at PCC with and without ESS voltage support.
Figure 8:
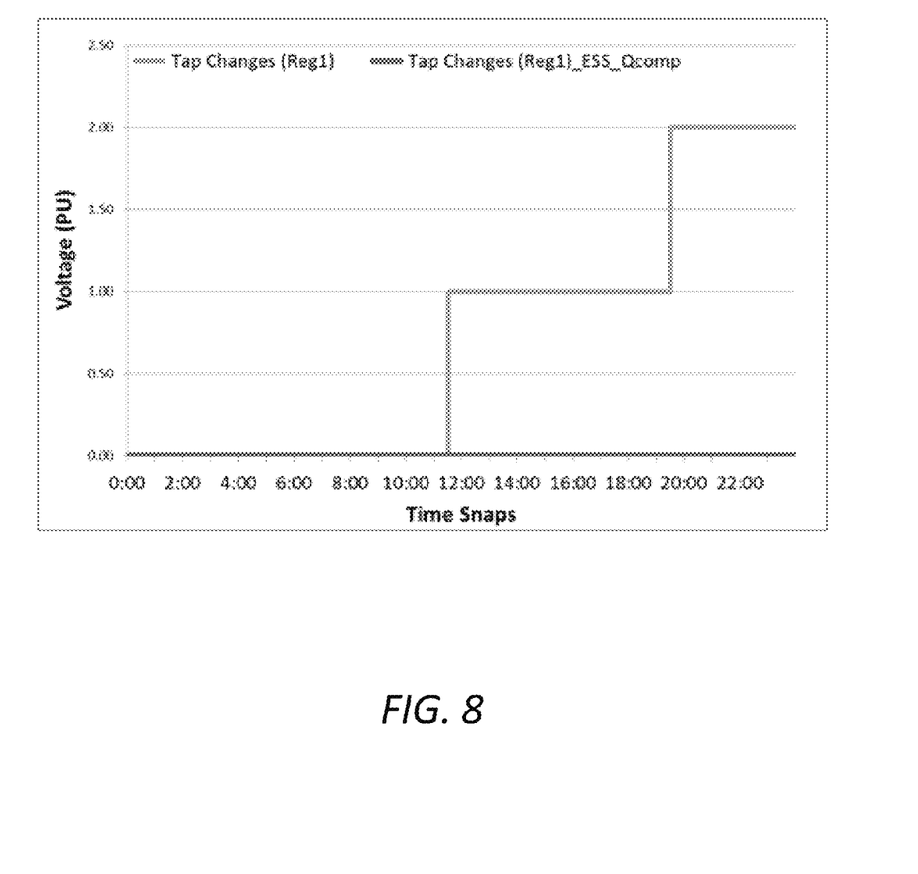
FIG. 8 is a plot illustrating tap changes of a first feeder voltage regulator with and without ESS voltage support.
Figure 9:
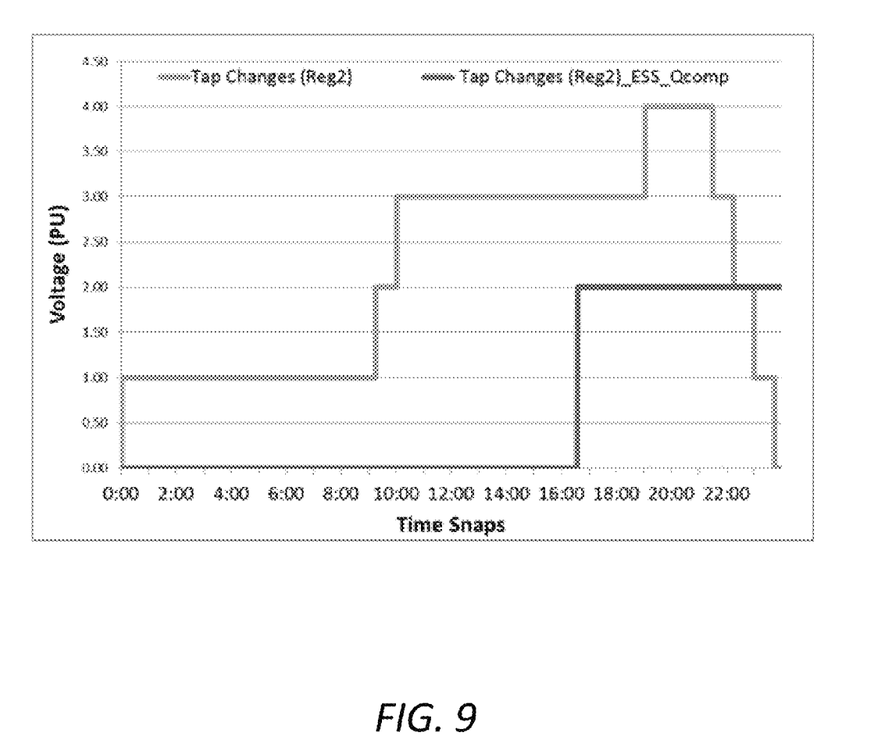
FIG. 9 is a plot illustrating tap changes of a second feeder voltage regulator with and without ESS voltage support.
Figure 10:
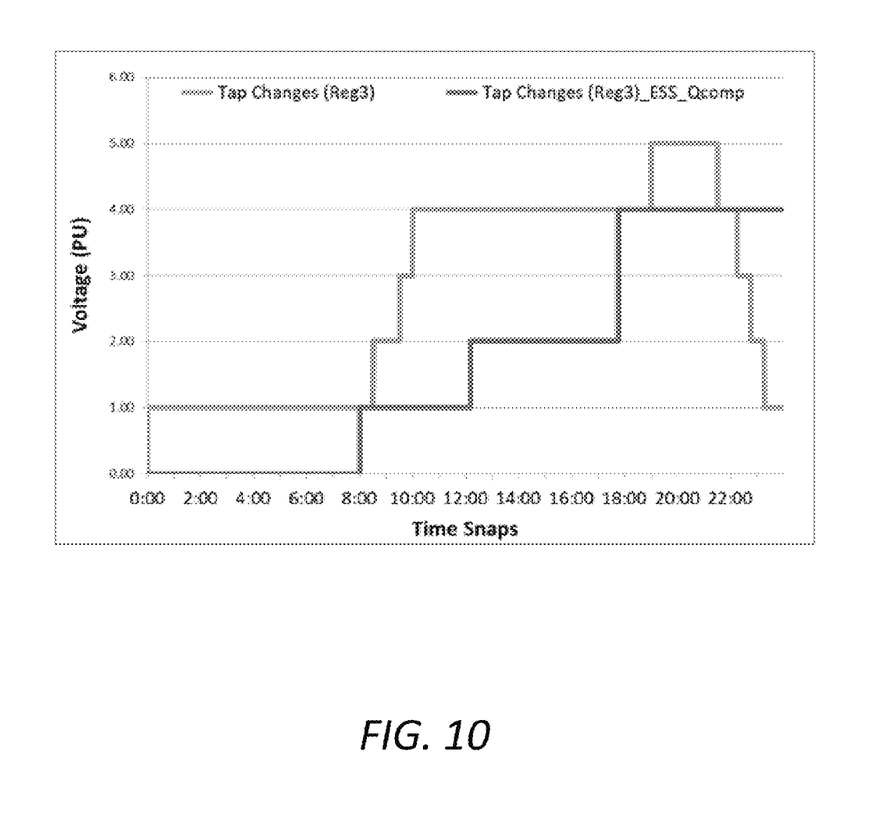
FIG. 10 is a plot illustrating tap changes of a third feeder voltage regulator with and without ESS voltage support.
Figure 11:
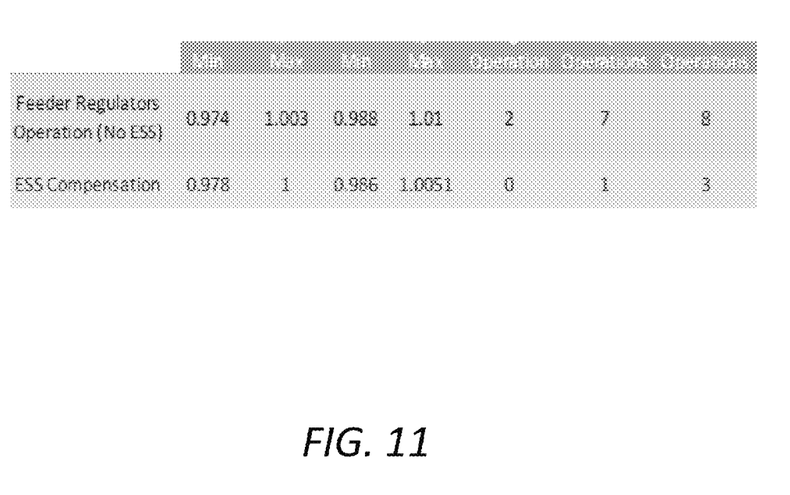
FIG. 11 is a table illustrating a comparison of feeder voltage levels and regulator tap changes with and without ESS voltage support.
Figure 12:
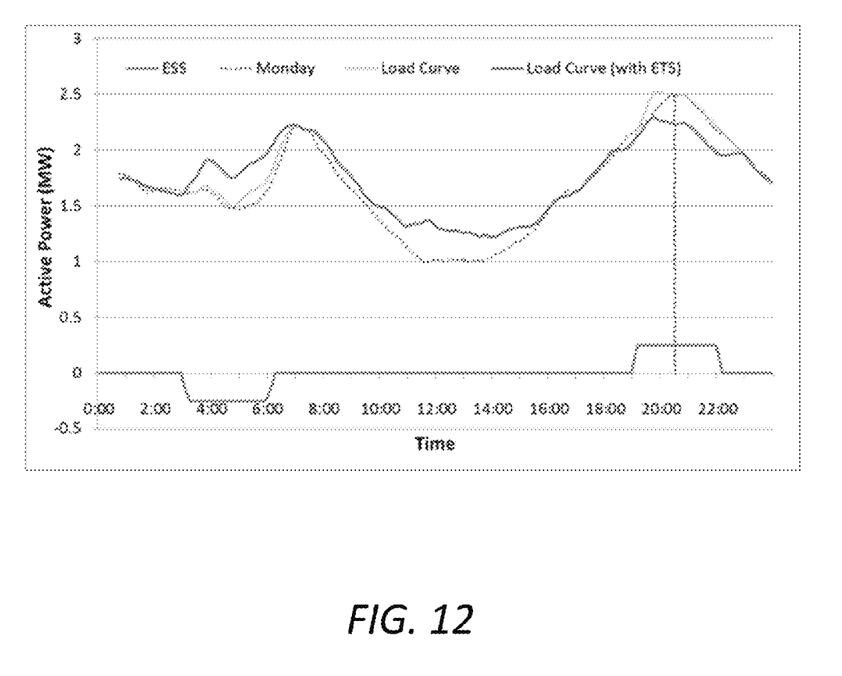
FIG. 12 is a plot illustrating a comparison of feeder load curves with and without ESS energy time shift.

In terms of results, FIG. 6 is a plot illustrating PV station capacity firming simulation results for PCC active power output after PV station capacity firming as compared to PV power output with no ESS intervention. FIG. 7 is a plot illustrating voltage profile at PCC with and without ESS voltage support. FIG. 8 is a plot illustrating tap changes of a first feeder voltage regulator with and without ESS voltage support. FIG. 9 is a plot illustrating tap changes of a second feeder voltage regulator with and without ESS voltage support. FIG. 10 is a plot illustrating tap changes of a third feeder voltage regulator with and without ESS voltage support. FIG. 11 is a table illustrating a comparison of feeder voltage levels and regulator tap changes with and without ESS voltage support. Finally, FIG. 12 is a plot illustrating a comparison of feeder load curves with and without ESS energy time shift.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A battery energy storage system control system, comprising:
    logic coupled to a photovoltaic station and an energy storage system and executing a photovoltaic station capacity firming algorithm operable for making a combined output of the photovoltaic station and the energy storage system substantially constant such that power swings on an associated feeder system are avoided;
    logic coupled to the photovoltaic station and the energy storage system and executing a voltage support algorithm operable for holding point of common coupling voltage and phase values substantially equal to substation voltage and phase values via power injection or removal; and
    logic coupled to the photovoltaic station and the energy storage system and executing an energy time shift algorithm operable for storing energy during periods of relatively low demand and providing energy during periods of relatively high demand, wherein the energy time shift algorithm calculates a probable time of peak load on a given feeder based on historical data and begins energy storage system discharge at a corresponding predetermined time before the calculated probable time of peak load to ensure peak load shaving, wherein the energy time shift algorithm calculates a time to commence energy storage system discharge such that a load curve maximum of a previous predetermined time period corresponds with a middle time of a discharge time interval utilized.

2. The system of claim 1, wherein the photovoltaic station capacity firming algorithm derives an optimal reference power output curve from historical data.

3. The system of claim 2, wherein the energy storage system supplements power output of the photovoltaic station to substantially match the optimal reference power output curve.

4. The system of claim 1, wherein the photovoltaic station capacity firming algorithm comprises intermittency detection logic that idles the energy storage system when a power output of the photovoltaic station is sufficiently constant.

5. The system of claim 1, wherein the voltage support algorithm monitors the point of common coupling voltage and phase values and the substation voltage and phase values in real time.

6. A battery energy storage system control method, comprising:
    making a combined output of the photovoltaic station and the energy storage system substantially constant such that power swings on an associated feeder system are avoided via logic coupled to a photovoltaic station and an energy storage system using a photovoltaic station capacity firming algorithm;
    holding point of common coupling voltage and phase values substantially equal to substation voltage and phase values via power injection or removal via logic coupled to the photovoltaic station and the energy storage system using a voltage support algorithm; and
    storing energy during periods of relatively low demand and providing energy during periods of relatively high demand via logic coupled to the photovoltaic station and the energy storage system using an energy time shift algorithm, wherein the energy time shift algorithm calculates a probable time of peak load on a given feeder based on historical data and begins energy storage system discharge at a corresponding predetermined time before the calculated probable time of peak load to ensure peak load shaving, wherein the energy time shift algorithm calculates a time to commence energy storage system discharge such that a load curve maximum of a previous predetermined time period corresponds with a middle time of a discharge time interval utilized.

7. The method of claim 6, wherein the photovoltaic station capacity firming algorithm derives an optimal reference power output curve from historical data.

8. The method of claim 7, wherein the energy storage system supplements power output of the photovoltaic station to substantially match the optimal reference power output curve.

9. The method of claim 6, wherein the photovoltaic station capacity firming algorithm comprises intermittency detection logic that idles the energy storage system when a power output of the photovoltaic station is sufficiently constant.

10. The method of claim 6, wherein the voltage support algorithm monitors the point of common coupling voltage and phase values and the substation voltage and phase values in real time.

11. An energy delivery system, comprising:
a photovoltaic station;
an energy storage system;
logic coupled to the photovoltaic station and the energy storage system and executing a photovoltaic station capacity firming algorithm operable for making a combined output of the photovoltaic station and the energy storage system substantially constant such that power swings on an associated feeder system are avoided;
logic coupled to the photovoltaic station and the energy storage system and executing a voltage support algorithm operable for holding point of common coupling voltage and phase values substantially equal to substation voltage and phase values via power injection or removal; and
logic coupled to the photovoltaic station and the energy storage system and executing an energy time shift algorithm operable for storing energy during periods of relatively low demand and providing energy during periods of relatively high demand, wherein the energy time shift algorithm calculates a probable time of peak load on a given feeder based on historical data and begins energy storage system discharge at a corresponding predetermined time before the calculated probable time of peak load to ensure peak load shaving, wherein the energy time shift algorithm calculates a time to commence energy storage system discharge such that a load curve maximum of a previous predetermined time period corresponds with a middle time of a discharge time interval utilized.

12. The system of claim 11, wherein the photovoltaic station capacity firming algorithm derives an optimal reference power output curve from historical data.

13. The system of claim 12, wherein the energy storage system supplements power output of the photovoltaic station to substantially match the optimal reference power output curve.

14. The system of claim 11, wherein the photovoltaic station capacity firming algorithm comprises intermittency detection logic that idles the energy storage system when a power output of the photovoltaic station is sufficiently constant.

15. The system of claim 11, wherein the voltage support algorithm monitors the point of common coupling voltage and phase values and the substation voltage and phase values in real time.

* * * * *